July 18, 1967   J. E. MOLL   3,331,635
TRAILER LATCH
Filed Aug. 26, 1965

INVENTOR.
JACK E. MOLL
BY
RONALD E. BARRY
Attorney 3,331,635
TRAILER LATCH
Jack E. Moll, New Berlin, Wis., assignor to Miller Tilt-Top Trailer, Inc., Milwaukee, Wis., a corporation of Wisconsin
Filed Aug. 26, 1965, Ser. No. 482,819
2 Claims. (Cl. 298—38)

This invention relates to a tilting type trailer, and more particularly to a positive latch which is used to secure the tilting platform to the frame of the trailer.

Tilting type trailers include a flat bed platform which is pivotally mounted on a frame in a balanced relation so that by changing the position of the load on the platform, the platform can be pivoted either to a discharge position or to a carrying position. Since the platform is balanced it is essential that some form of latch be provided to secure the platform to the trailer when the platform is moved to the carrying position.

One of the principal objects of the present invention is to provide an improved latch which is simple in its construction but sufficiently strong to rigidly secure the platform to the frame of the trailer.

Another object of the present invention is to provide an improved latch for use with a tilting type platform trailer which automatically compensates for wear between the trailer and platfrom and thereby provides a rigid connection between the frame and platform for the full life of the trailer.

Another object of the present invention is to provide an improved latch for a tilting type trailer which is simple in its construction and easy to manufacture.

Still another object of the present invention is to provide a latch for a tilting type trailer which is simple to operate and readily accessible to the user.

A further object of the present invention is to provide a latch for a tilting type trailer which is limited in its travel and cannot come apart in use.

These objects are accomplished in a trailer having a platform pivotally mounted on the frame in a balanced relation. The platform is so balanced that changes in the distribution of the weight of a load on the platform will normally cause it to tilt. These trailers are used primarily in the transportation of construction equipment which can driven on and off of the platform. The latch includes a plate secured to one of the channel members of the frame in close proximity to the front end of the platform. A bracket is mounted on the plate and is supported by a triangular plate so that it is rigid with respect to the plate. A threaded rod is threaded through the bracket with its end projecting through an aperture in the plate so that it can be turned into engagement with the front end of the platform. The end is tapered for engagement with a wear block located on the upwardly angled front channel member of the trailer. The cooperating angular relation of the end of the rod and the wear block is such that it automatically compensates for wear in either of the members. A C-type washer is snapped into a groove in the rod located at the end of the threaded section of the rod to limit the forward motion of the rod and to prevent removal of the rod from the bracket. With this arrangement, the user merely has to turn the rod to either withdraw it from the channel member so that the trailer can be tilted to the unloading position and in the other direction and tilted to the carrying position by the user merely turing the crank to bring the end of the rod into engagement with the block and locking the platform to the frame.

Other objects and advantages of the present invention will become more readily apparent from the following detailed description when read in conjunction with the accompanying drawings, in which.

Figure 1:
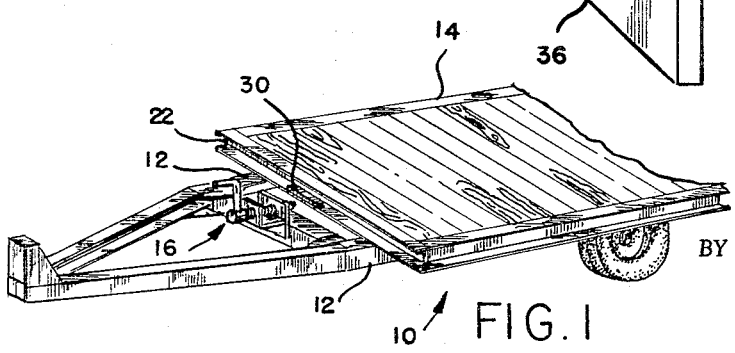
FIG. 1 is a perspective view of a tilting type trailer with the improved latch located on the main frame.

Referring more particularly to the drawings, in FIG. 1 a tilting type trailer 10 is shown having a main frame 12 and a tilting platform 14. The platform is free to pivot on the frame and is balanced so that it can be rotated from one position to the other by merely shifting the weight on the platform.

Figure 2:
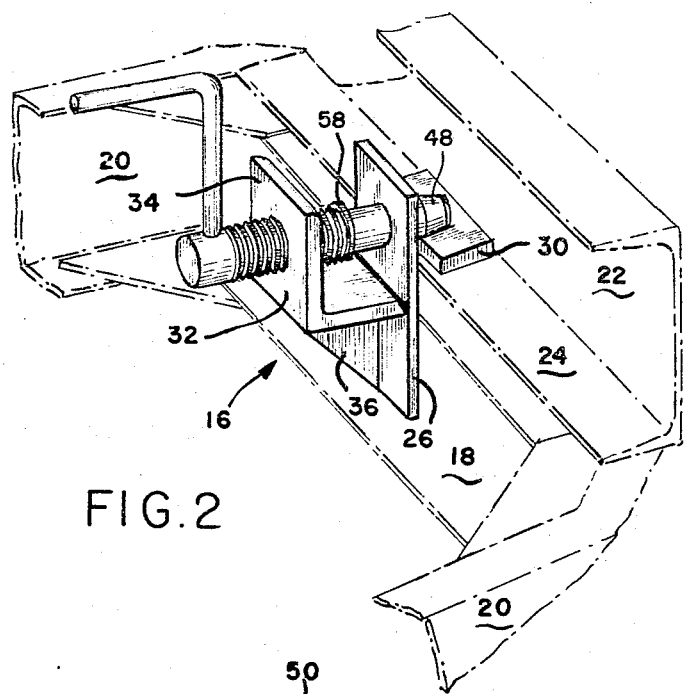
FIG. 2 shows the latch mounted on the frame in engagement with the platform.
Figure 4:
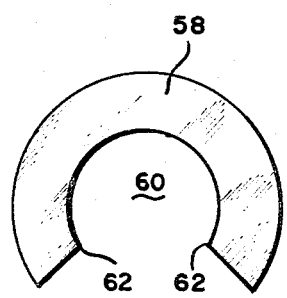
FIG. 4 is a view of the snap ring which is used to hold the rod in the bracket.
Figure 3:
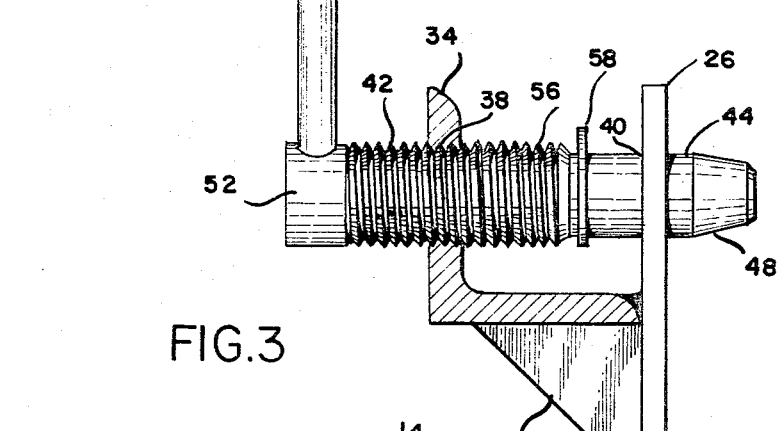
FIG. 3 is a side view of the latch partly in section showing the engagement of the rod with the channel member.

The platform is secured to the frame when horizontal by latch 16 mounted on the frame. Referring to FIG. 2, an enlarged section of the frame is shown having a cross member 18 secured to the side channel member 20. Front channel member 22 of the platform is shown resting on the top of cross member 18. The lower flange 24 of the channel member angles upward slightly and a block 30 is secured to the upper surface of the flange in alignment with latch 16.

The latch includes a support plate 26 which is secured to the front of cross member 28. The plate extends vertically upward in a parallel relation to channel member 22 and in alignment with the block 30. An L bracket 32 is secured to the plate 26 with one of its legs 34 spaced from and parallel to the support plate. A triangular plate 36 is welded to the support plate and to the underside of the L bracket so that the plate, L bracket and triangular plate form a rigid structure.

A threaded aperture 38 is provided in leg 34 in axial alignment with an aperture 40 in the support plate. A threaded rod 42 is screwed through threaded aperture 38 with its unthreaded end 44 projecting through aperture 46 in the support plate. End 48 of the rod is tapered to engage block 30 on the channel member when the rod is turned into the L bracket. An L shaped handle 50 is secured to the other end 52 of the rod to aid in turning the rod into and out of engagement with the channel member of the platform. It should be apparent that as the tapered end of the rod is worn or as the engaging surface of the top of block 30 is worn, the rod can be turned farther to lock the platform tightly to the frame; in other words, as the block or end is worn through frictional engagement in use, it will automatically adjust to this loss of surface area so that a positive lock is always provided between the platform and frame.

The rod is provided with an annular slot 54 in front of the threaded section 56 and a C type washer 58 having a central aperture 60 is forced onto the slot until the ends 62 of the washer pass through the diametrical center of the rod at which time they will snap the ring into the slot. When the rod is turned either into or out of the bracket, it will be limited in its travel by the C washer making it impossible to remove it from the bracket as well as protecting it from damaging the aperture in the support plate.

In the embodiment illustrated in the drawings, the support plate and angle bracket are shown with the angle bracket secured to the side of the support bracket remote from the platform. The angle bracket could be turned around so that it rests on the frame and the triangular plate would not be necessary.

Although only one embodiment of the present inventino has been shown and described, it should be obvious that various changes and modifications can be made here-

What is claimed is:

1. A trailer having a frame supported on wheels, a platform mounted on said frame for pivotal motion relative to said frame, said platform having a frame member across its front end, said frame member having an upwardly and rearwardly inclined surface, a latch for locking said platform to said frame when the platform is rotated into engagement with said frame, said latch including a support plate mounted on said frame in close proximity to the channel member on said platform, and having an aperture with its axis transverse to the plane of the channel member, an angle bracket on said support plate and having an aperture axially aligned with the aperture in said support plate, one of said apertures being threaded and the other aperture unthreaded, a rod having a threaded section and an unthreaded section, said rod being mounted in said plates with the threaded section mounted in the threaded aperture and the unthreaded section extending through the unthreaded aperture, the unthreaded end of said rod being tapered to engage the inclined surface on said frame member, whereby on rotation of said rod in one direction, the rod will engage the inclined surface on said frame member, locking the platform to the frame and on rotating the rod in the other direction, the platform will be free to rotate on the frame.

2. A trailer according to claim 1 including a wear block mounted on said inclined surface in alignment with said rod to compensate for wear between the rod and the block.

References Cited

UNITED STATES PATENTS

| 2,225,522 | 12/1940 | Keith | 298—38 X |
| 2,457,857 | 1/1949 | Adams | 296—51 |
| 2,639,176 | 5/1953 | Montalbano | 292—58 |
| 3,117,820 | 1/1964 | Toland | 298—38 |

FOREIGN PATENTS 201,917　7/1924　Great Britain.

BENJAMIN HERSH, *Primary Examiner.*

RICHARD J. JOHNSON, *Examiner.*